(12) United States Patent
Hahn

(10) Patent No.: US 8,194,585 B2
(45) Date of Patent: Jun. 5, 2012

(54) WIRELESS COMMUNICATION SYSTEM

(75) Inventor: Philip Hahn, Berwick, ME (US)

(73) Assignee: OMNI-WiFi, LLC., Berwick, ME (US)

( * ) Notice: Subject to any disclaimer, the term of this patent is extended or adjusted under 35 U.S.C. 154(b) by 0 days.

(21) Appl. No.: 12/571,008

(22) Filed: Sep. 30, 2009

(65) Prior Publication Data

US 2010/0020741 A1    Jan. 28, 2010

Related U.S. Application Data

(63) Continuation-in-part of application No. 11/287,799, filed on Nov. 28, 2005, now abandoned.

(51) Int. Cl.
*H04B 7/185* (2006.01)
(52) U.S. Cl. ........ 370/318; 370/315; 370/352; 370/401; 370/468; 455/7; 455/11.1; 455/12.1; 455/13.1; 455/13.3; 455/13.4
(58) Field of Classification Search .................. None
See application file for complete search history.

(56) References Cited

U.S. PATENT DOCUMENTS

| | | | |
|---|---|---|---|
| 6,429,827 B1 * | 8/2002 | Hsueh et al. .................. 343/820 |
| 6,441,723 B1 * | 8/2002 | Mansfield et al. ....... 340/538.11 |
| 6,583,763 B2 | 6/2003 | Judd | |
| 6,812,905 B2 | 11/2004 | Thomas et al. | |
| 2002/0073434 A1 * | 6/2002 | Pience .......................... 725/119 |
| 2002/0111192 A1 | 8/2002 | Thomas et al. | |
| 2002/0141382 A1 * | 10/2002 | Winther et al. ............... 370/352 |
| 2002/0158801 A1 * | 10/2002 | Crilly et al. ................... 342/378 |
| 2003/0169720 A1 * | 9/2003 | Sebastian et al. ............ 370/342 |
| 2003/0185169 A1 | 10/2003 | Higgins | |
| 2004/0048596 A1 | 3/2004 | Wyrzykowska et al. | |
| 2004/0166802 A1 * | 8/2004 | McKay et al. .................. 455/15 |
| 2004/0203706 A1 * | 10/2004 | Dietz et al. ................. 455/422.1 |
| 2005/0033513 A1 * | 2/2005 | Gasbarro ...................... 701/213 |
| 2005/0066371 A1 * | 3/2005 | Lu ................................. 725/105 |
| 2005/0085267 A1 * | 4/2005 | Lemson et al. ............ 455/562.1 |
| 2005/0208974 A1 * | 9/2005 | Tripathi ........................ 455/561 |
| 2005/0254442 A1 * | 11/2005 | Proctor et al. ................ 370/294 |
| 2006/0251115 A1 * | 11/2006 | Haque et al. ................. 370/466 |
| 2008/0039012 A1 * | 2/2008 | McKay et al. ............... 455/11.1 |
| 2008/0076437 A1 * | 3/2008 | Wilson et al. ................ 455/450 |

FOREIGN PATENT DOCUMENTS

| | | |
|---|---|---|
| EP | 1098539 A2 | 5/2001 |
| WO | WO 02/082665 A2 | 10/2002 |

* cited by examiner

*Primary Examiner* — Jae Y Lee
(74) *Attorney, Agent, or Firm* — Duane Morris, LLP

(57) ABSTRACT

A modular wireless Internet access communications system designed to extend broadband 802.3 linear-bus topology up to fifteen miles beyond the physical limits of DSL or cable technologies through the integration of specialized wireless hardware devices, firmware, and protocols.

8 Claims, 7 Drawing Sheets

WIRELESS COMMUNICATION SYSTEM

CROSS REFERENCE TO RELATED APPLICATION

This application is a continuation in part of U.S. Ser. No. 11/287,799, filed Nov. 28, 2005 now abandoned, entitled Wireless Communication System, by Hahn, Philip, which is hereby incorporated by reference.

BACKGROUND OF THE INVENTION

1. Technical Field

The invention relates generally to the field of wireless Internet communications. More specifically, the invention is directed to an improved modular wireless Internet access communications system designed to extend wireless access up to fifteen miles beyond the physical limits of DSL or cable technologies, through the integration of specialized wireless hardware devices, firmware, and protocols.

2. Description of Prior Art

Wireless communication systems are known in the art. However, the current art is limited to short range wireless Internet access due to technical and regulatory limitations. The effective transmission power of radio frequency devices is measured as EIRP (Effective Isotropic Radiated Power). EIRP takes into account the power output of a transmitter, gains that an antenna provides, and losses from cabling. The Federal Communications Commission restricts the total EIRP of a wireless communication device to minimize radio frequency signal interference. The gain of an antenna represents how well it increases effective signal strength, measured in dBi (decibels relative to an isotropic radiator). Higher values of antenna dBi represent a greater range of effective transmission and reception of radio frequency signals; the latter due to greater sensitivity and added gain to incoming radio signals that are naturally weaker than transmitted signals. The current art uses relatively high powered amplifiers to make up for losses occurring through the cabling (up to 90% of the signal strength of radio frequency signals may be lost in just a 10-foot run of cable). This increases cost and does not address a fundamental problem of wireless networks; the transmit-versus-receive signal imbalance inherent in nearly all radio systems. The transmitted signal strength is generally several hundred times higher than that of the received signal. Range is as dependent on receive sensitivity and gain as it is on transmitted signal strength. Increasing only the gain in transmission or increasing transmit and receive gain equally rapidly reaches the power limits imposed by the FCC, restricting overall range.

The prior art discloses various wireless communication devices which share some similar characteristics with the present invention, though which fail to accomplish the primary objective of extended range wireless Internet access in a simple, low cost modular system.

Thomas, et al., Integrated Active Antenna For Multi-Carrier Applications, U.S. Pat. No. 6,812,905 (Nov. 2, 2004) discloses a system incorporating a plurality of antenna elements and power amplifiers. This system mounts an amplifier closely adjacent to each associated antenna element to minimize power loss. However, it requires one amplifier per antenna, and further requires a large number of antennas arranged in an array. These limitations result in a more complex and costly solution than the present invention. It also does not achieve the extended range of the present invention.

Judd, Antenna Structure And Installation, U.S. Pat. No. 6,583,763 (Jun. 24, 2003) also discloses a plurality of antenna elements and power amplifiers, with each amplifier oriented in close proximity to an antenna. However, the disclosed invention physically separates multiple radio transceivers, locating some on a tower and others at the base of the tower, thereby failing to capture the efficiencies of locating the transceivers proximate to the antennas.

Higgins, Wireless Internet Access System, US Patent Application 2003/0185169 (pub. Oct. 2, 2003) discloses a roof-mounted water-tight enclosure in connection with an antenna, containing a wireless modem and a power splitter. The disclosed invention, however, relies on a multiplicity of access points feeding back to a higher access point to the wired gateway. It further does not use routers at the access points.

Quayle, Cellular wireless Internet access system using spread spectrum and Internet protocol, European Patent Application 1098539 A2 (pub. May 9, 2001) discloses a high speed wireless Internet access system incorporating a plurality of cellular base stations located a ground level, for receiving/transmitting over a relatively short effective range of not more than 0.5 miles.

Dodd, et al., Antenna System, Patent Cooperation Treaty Application WO 2002/082665 A2 (pub. Oct. 17, 2002) discloses a dual antenna system with a high gain antenna for receiving signals and a low gain antenna for transmitting signals, together with a switched receiver/transmitter.

The above-cited prior art is easily distinguished from the present invention. The ability of the present invention to be configured without an amplifier, due to the minimization of signal strength loss, distinguishes it from the systems cited, each of which requires an amplifier. The present invention does not require large antenna arrays. The prior art does not capitalize on the efficiencies to be gained from placing the radio transceiver in close proximity to the antenna. These and other features of the present invention, described below, disclose a novel and useful invention.

It is an objective of the present invention to provide low cost, long range wireless Internet access.

It is a further object to provide a modular wireless communication system which may be customized by using one or more of the modules to individual customer needs.

It is yet a further object to provide a wireless communication system which can be mounted in a variety of environments, such as atypical structures without traditional power supplies, or with exposure to weather extremes.

Other objects of the present invention will be readily apparent from the description that follows.

SUMMARY OF THE INVENTION

The invention comprises multiple special purpose wireless devices integrated into a wireless communication system for the purposes of providing "last mile" wireless Internet connectivity. Depending on the existing local services available, one or several of the wireless devices may need to be used in conjunction with each other, with potentially multiples of each type of wireless device used in a single wireless communication system.

The three special purpose wireless devices are a wireless communication device, a wireless bridge device, and a wireless repeater. The wireless communication system must have at least one wireless communication device. In various embodiments it may also have one or more wireless bridge devices, and one or more wireless repeaters.

The wireless communication device is comprised of one or two radio transceivers, routers, and switches; an antenna element; cabling; Ethernet cables; a heat sink, programmable firmware, and a power supply interface. These elements allow the wireless communication device to receive electronic information via a broadband modem from one or more computing devices and/or the Internet and to transmit the electronic information to one or more wireless computing devices, as well as to receive electronic information from one or more wireless computing devices and to transmit the electronic information via the broadband modem to said one or more computing devices and/or the Internet. Depending on the specific configuration, the wireless communication device may provide wireless communication access to wireless computing devices up to 3.5 miles away.

The wireless bridge device is comprised of a radio transceiver and switch, an antenna element, cabling, a heat sink, and a power supply interface. These elements allow the wireless bridge device to receive electronic information from a wireless communication device and to transfer the electronic information to one or more Ethernet routers located at a client site, as well as to receive electronic information from one or more wireless routers and to transmit the electronic information to the wireless communication device. The wireless bridge device has no independent connection to the Internet but rather must be used in conjunction with the wireless communication device.

The wireless repeater is comprised of a routing transmitter, a non-routing bridge receiver, a first antenna element, a second antenna element, and a power adapter. These elements allow the wireless repeater to receive and retransmit electronic communications between the wireless communication device and the wireless bridge device, thereby allowing for an increased distance between the devices and extending the effective range of the wireless communication system.

A bi-directional amplifier may be used to help balance the transmit and receive gain levels, especially to incoming signals from wireless clients whose power output is naturally weaker than that of the transmitter. Most bi-directional amplifier systems increase transmit and receive gain proportionally and soon reach the FCC limitation for transmitted output power, before the appropriate receive gain level is achieved. There is no FCC limitation on receive gain amplification. Therefore the receive gain can be boosted as necessary to achieve network balance. For example, for a typical wireless transmitter outputting 1 watt EIRP, a typical wireless client returns only 50 mw to 100 mw EIRP to the transmitter, which results in wireless network imbalance. At long range, the received signal has insufficient power to travel back to the transmitter, making communication impossible In the present invention, the amplification for the weaker client signal takes place through the use of a non-proportional bi-directional amplifier located at the transmitter.

Other features and advantages of the invention are described below

DETAILED DESCRIPTION OF THE INVENTION

The invention comprises multiple special purpose wireless devices integrated into a wireless communication system 400. See FIG. 1.

Figure 2:
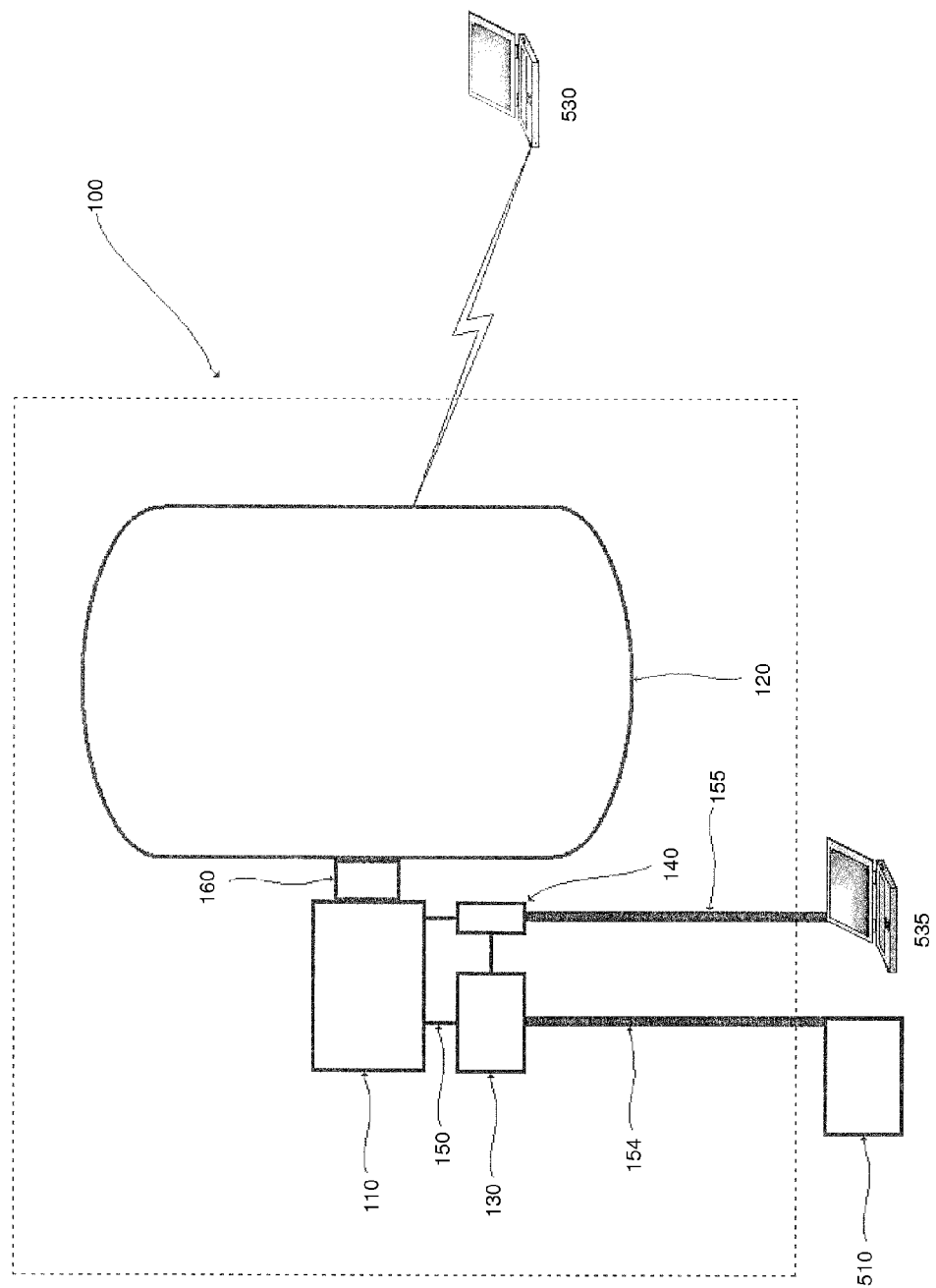
FIG. 2 is a schematic depiction of the components of an embodiment of the wireless communication device of the present invention, said wireless communication device in communication with a broadband modem through an Ethernet data cable, in communication with a management computer through an Ethernet management cable, and in wireless communication with a computing device.

The first of the wireless devices is a wireless communication device 100 comprising a first radio transceiver 110, an antenna element 120, a first router 130, a first switch 140, first cabling 150, a first Ethernet data cable 154, a first Ethernet management cable 155, a first heat sink 160, programmable firmware, and a power supply interface 170. See FIG. 2. These elements allow the wireless communication device 100 to receive electronic information via a broadband modem 510 from one or more computing devices 530 and/or the Internet and to transmit the electronic information to one or more wireless computing devices 530 as well as to receive electronic information from one or more wireless computing devices 530 and to transmit the electronic information via the broadband modem 510 to said one or more computing devices 530 and/or the Internet. Depending on the specific configuration, the wireless communication device 100 may provide wireless communications access to wireless computing devices 530 up to 3.5 miles away. Typically, the wireless communication device 100 is mounted on a tower 540, though it may also be mounted on the exterior of a structure, such as on the roof of a building, on a utility pole, or in any other suitable location.

The wireless communication device 100 is managed by a client site management computer 535, which communicates with the wireless communication device 100 by a device management communications means. In the preferred embodiment the device management communications means is the first Ethernet management cable 155, which connects the client management computer 535 to the wireless communication device 100 at the first switch 140. The management computer 535 may be any general purpose computer supplied by the user having a user interface and an Ethernet port. The management computer 535 determines how many wireless users are online and their MAC address identities; it increases or decreases the transmission power from the first radio transceiver 110 into the antenna element 120; it sets and changes encryption codes that control log-on (using two-way encryption and password authentication); it sets various parameters of the wireless communication device 100, such as outside WAN IP address and subnet information, inside LAN IP address and subnet information, and firewall settings between inside and outside networks; and it is used to do a firmware upgrades.

The first radio transceiver 110 of the wireless communication device 100 is an integrated radio frequency signal receiver and transmitter, suitably adapted to receive and transmit radio frequency signals. Such radio transceivers are well known in the art and any appropriate radio transceiver capable of receiving and transmitting radio frequency signals may be used in the wireless communication device 100. In the preferred embodiment the first radio transceiver 110 operates on a 2.4 gHz frequency. The power output of the first radio transceiver 110 is in excess of 50 mw, and in the preferred embodiment is 79 mw.

The antenna element 120 of the wireless communication device 100 is suitably adapted to direct radio frequency signals to and from the first radio transceiver 110. Various types of antenna known in the art may be used, such as dish antennas, providing short range communications, panel antennas, providing medium range communications, and parabolic antennas, providing long range communications. Other types of antennas may also be used. In the preferred embodiment the antenna element 120 is a panel antenna configured to have an interior portion 122 which is sealable against the weather. The antenna element 120 has a gain in excess of 10 dBi, and in the preferred embodiment the gain is 14 dBi. In one embodiment a Rootenna™ model RT24-14 14 dBi Panel Antenna may be used as the antenna element 120.

Figure 3:
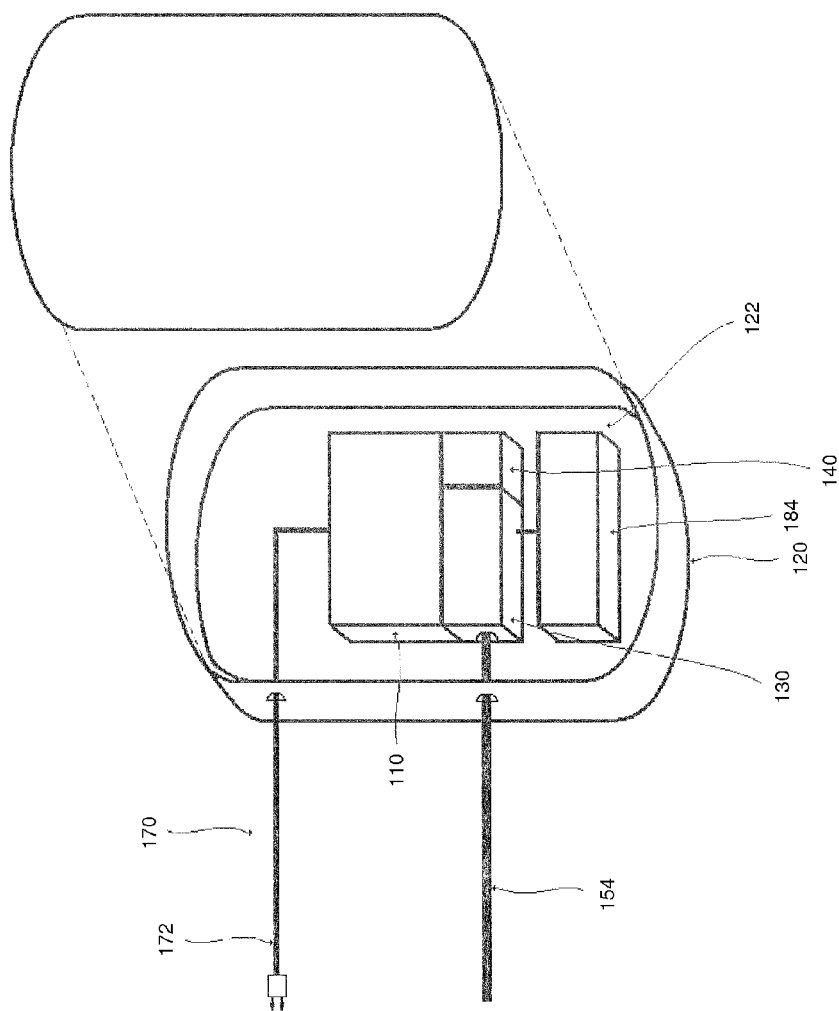
FIG. 3 is a schematic depiction of the preferred embodiment of the wireless communication device, said wireless communication device comprising a panel antenna having an interior portion into which is placed an integrated first radio transceiver/first router/first switch device, said panel antenna shown with its cover removed.

The first router 130 of the wireless communication device 100 is suitably adapted to direct radio frequency signals between a broadband modem 510 and the first radio transceiver 110. Such routers are well known in the art. In the preferred embodiment the first router 130 is integrated with the first radio transceiver 110. See FIG. 3. Integrated routers/radio transceivers are well known in the art. In one embodiment a Linksys™ model WRT54G v.2 Wireless Router may be used as the integrated first radio transceiver 110 and first router 130.

The first switch 140 of the wireless communication device 100 is suitably adapted to alter the operation of the first radio transceiver 110 between receiving mode and transmitting mode, providing half-duplex communications through the first radio transceiver 110. In the preferred embodiment the first switch 140 is integrated with the first radio transceiver 110. See FIG. 3.

The first cabling 150 of the wireless communication device 100 is suitably adapted to place the first radio transceiver 110, the antenna element 120, the first router 130, and the first switch 140 in physical communication with each other. To the extent that any of these components are integrated with each other the first cabling 150 is not required to place said components in physical communication with each other.

The programmable firmware of the wireless communication device 100 is integrated with and controls the output of power from the first radio transceiver 110. In one embodiment the programmable firmware is incorporated into a Linksys™ model WRT54G v.4 Wireless Router and is programmed to establish a power output of 28 mw. When coupled with the preferred antenna element 120 having a gain of 14 dBi, the total EIRP of the wireless communication device 100 is 2000 mw, which is up to 100 times more powerful than the off-the-shelf WRT54G router.

The wireless communication device 100 is connected to a broadband modem 510 by the first Ethernet data cable 154, whereby electronic information may be communicated to and from the wireless communication device 100 along the first Ethernet data cable 154. One end of the first Ethernet data cable 154 is connected to the first router 130 and the other end of the first Ethernet data cable 154 is connected to the broadband modem 510. This configuration is well known in the art.

Figure 4:
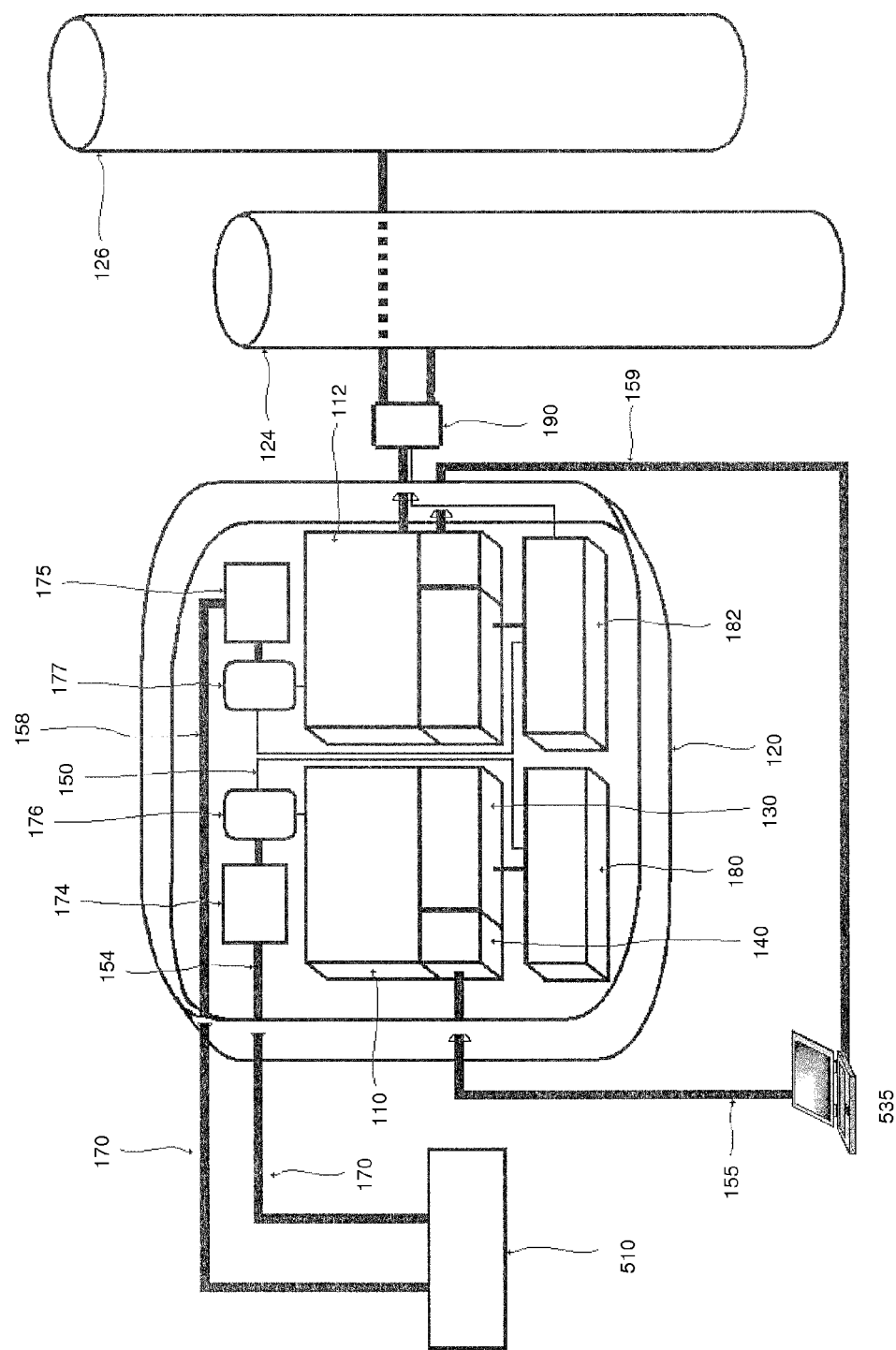
FIG. 4 is a schematic depiction of an alternative embodiment of the wireless communication device.

The power supply interface 170 of the wireless communication device 100 is suitably adapted to establish a powered connection between the wireless communication device 100 and a power supply. In one embodiment the power supply interface 170 is a power cord 172 suitably adapted to be plugged into a standard wall outlet. See FIG. 3. In another embodiment the wireless communication device 100 also comprises a power adapter 174 suitably adapted to provide Power over Ethernet ("PoE") functionality. See FIG. 4. In this embodiment the power supply interface 170 is the first Ethernet data cable 154. In one embodiment a BreezeNet™ PoE power splitter/power injector is used as the power adapter 174.

The wireless communication device 100 uses a first heat sink 160 which is suitably adapted to dissipate heat away from the wireless communication device 100. Various configurations of heat sinks are well known in the art and may be used. In the preferred embodiment the first heat sink 160 is constructed out of aluminum. The first heat sink 160 is located adjacent to the first radio transceiver 110, which is the primary source of heat buildup in the wireless communication device 100. Without a heat sink to cool the wireless communication device 100 in hot weather, the wireless communication device 100 would overheat and fail when temperatures exceed 90° F. In the preferred embodiment the first heat sink 160 is interposed between the first radio transceiver 110 and the antenna element 120, with the first heat sink 160 being adjacent to and in contact with the antenna element 120.

While most of the components of the wireless communication device 100 described above need have no particular physical orientation with regard to each other, the first radio transceiver 110 must be placed sufficiently close to the antenna element 120 to eliminate substantially all appreciable power loss between the first radio transceiver 110 and the antenna element 120. The distance between the first radio transceiver 110 and the antenna element 120 should be able to be bridged by twelve inches or less of cabling. In one embodiment, the wireless communication device 100 comprises a weather-resistant casing suitably adapted to contain the antenna element 120, the first radio transceiver 110, the first router 130, the first switch 140, and the first cabling 150. This casing is mountable on the exterior of structures. In the preferred embodiment the length of the first cabling 150 connecting the first radio transceiver 110 with the antenna element 120 is eight inches.

In the most preferred embodiment in which the antenna element 120 is a weather-resistant panel antenna having an interior portion 122, the first radio transceiver 110 is placed within the interior portion 122 of the panel antenna. See FIG. 3. This configuration prevents substantially all appreciable power loss between the first radio transceiver 110 and the antenna element 120. This is because, when using 2.4 gHz technology, most of the power loss is in the cable that connects the antenna to the radio transceiver. The greater the length, the greater the power loss, with as much as 90% of the signal strength of radio frequency signals being lost in just a 10-foot run of cable. By placing the first radio transceiver 110 within the antenna element 120 and keeping the length of the first cabling 150 to a minimum, very little power leakage occurs, and what little power leakage does occur is captured by the antenna element 120 due to its close proximity to the first radio transceiver 110. This configuration provides a high level of efficiency to the wireless communication device 100 and as a consequence a far greater range using lower power than other wireless communication devices.

In an alternative embodiment of the wireless communication device 100, the wireless communication device 100 further comprises a first amplifier 180, suitably adapted to increase the strength of a radio frequency signal transmitted by the first radio transceiver 110. See FIG. 4. Such amplifiers are well known in the art. In one embodiment the first amplifier 180 is bi-directional, operates on 2.4 gHz, and has an output of between 350 mw and 750 mw, with the most preferred output being 500 mw. In using such an amplifier, together with the first radio transceiver 110 programmed to output 28 mw and coupled with an antenna element 120 with a gain of 14 dBi, a wireless communication device 100 may have an EIRP of up to 14,000 mw. This may be attenuated to an EIRP of 3,980 mw by the programmable firmware. An EIRP of 14,000 mw provides very long range wireless communications and is particularly desired in countries which do not limit total EIRP of wireless communication devices. In an alternative embodiment the antenna element 120 may have a gain of 19 dBi, which when coupled with an amplifier 180 having an output of 1000 mw provides an output of over 100,000 mw, and in still another embodiment the antenna element 120 may be a parabolic antenna having a gain of 24 dBi, which when coupled with an amplifier 180 having an output of 1000 mw provides an output of over 550,000 mw. Such configurations are generally restricted to use outside the United States, where the FCC typically limits total EIRP to 4,000 mw (though certain configurations having greater power output may also conform to FCC).

In another alternative embodiment of the wireless communication device 100, performance is improved by adding a second radio transceiver 112; a second router; a second switch; two amplifiers 180,182; a second Ethernet data cable 158; a second Ethernet management cable 159; second cabling; a second heat sink; and two power splitters 176,177. See FIG. 4. The power splitters 176,177 are suitably adapted to direct power from the power supply along the power supply interface 170 to each of the first and second amplifiers 180, 182. These additional components are comprised of and/or configured in the same manner as their analogues described in the previous embodiments, with the second Ethernet data cable 158 being used to connect the second router with the broadband modem 510, the second Ethernet management cable 159 being used to connect the second switch with the management computer 535, the second heat sink located adjacent to the second router, and the programmable firmware further integrated with and controlling the output of power from the second router. As in all previously described embodiments, the second radio transceiver 112 must be placed sufficiently close to the antenna element 120 to eliminate substantially all appreciable power loss between the second radio transceiver 112 and the antenna element 120. In the preferred embodiment this is achieved by placing the second radio transceiver 112 within the interior portion 122 of the panel antenna used as the antenna element 120. See FIG. 4.

Having two radio transceivers 110,112 allows the wireless communication device 100 to serve two functions: first, to provide wireless Internet connectivity directly to client site computing devices 530 at a range of up to 3.5 miles away; and second, to provide a communications link to more distant clients through another type of wireless device, a wireless repeater 300, described more fully below. One of the two radio transceivers 110 is dedicated to providing connectivity to the client site while the other radio transceiver 112 is dedicated to communicating with the wireless repeater 300. In a variation on this embodiment the wireless communication device 100 further comprises a second antenna element 124. The second antenna element 124 may be a high gain antenna. The two antenna elements 120,124 may be high-gain sector antennas or panel antennas. The two antenna elements 120,124 must face different directions. A third antenna element 126 may also be used. See FIG. 4. When multiple antenna elements are used, an antenna power splitter 190 may be used in connection with the antenna elements to divide the radio frequency signals coming from a radio transceiver between the antenna elements. Splitting the radio frequency signals by use of an antenna power splitter 190 and directing those radio frequency signals to multiple antenna elements reduces the total EIRP per antenna, bringing the system configuration into FCC compliance, since limits on total EIRP is measured per antenna, not per system. In another variation on this embodiment the power supply interface 170 constitutes a pair of power cords 172 suitably adapted to be plugged into a standard wall outlet. In yet another variation of this embodiment the wireless communication device 100 also comprises a power adapter 174 and a second power adapter 175, both power adapters 174,175 suitably adapted to provide PoE functionality. See FIG. 4. In this variation the power supply interface 170 comprises the first and second Ethernet data cables 154,158. An example of such power adapters 174,175 is the BreezeNet™ PoE power splitter/power injector.

The above-described two-radio transceiver embodiment of the wireless communication device 100 is intended for applications where low to moderate power output is needed. When the second antenna 124 is used the total power output may be up to 104 watts EIRP when used omni-directionally. If the antennas 120,124 are used directionally (i.e., facing the direction of most of the client communications traffic), without an antenna power splitter, the total power output may be 160 watts EIRP. If a single antenna element 120 comprising a thirty-six inch parabolic antenna is used, with no amplification, 104 watts EIRP may be obtained. For wireless communication devices to be used in the United States for point-to-multi-point applications the total power output is limited to 4 watts EIRP per antenna. These greater power output levels described above remain within FCC standards because they are achieved by the use of high gain antennas, rather than from high output amplifiers.

In yet another alternative embodiment of the wireless communication device 100, a bi-directional radio frequency amplifier 184 is added. See FIG. 3. The bi-directional radio frequency amplifier 184 is interposed between the radio transceiver 110 and the antenna element 120. The bi-directional radio frequency amplifier 184 serves two purposes: a) it comprises a special filter used to prevent band-edge transmissions from propagating into upper and lower frequencies adjacent to the frequency currently in use; and b) it increases the radio frequency signals from the one or more wireless computing devices 530 to a greater extent than the radio frequency signals transmitted from the radio transceiver 110; that is, the bi-directional radio frequency amplifier 184 has the characteristic of reverse gain factor that greatly exceeds the forward gain factor. The forward gain is limited by FCC rules and regulations, but there is no such limitation on reverse gain. By amplifying reverse gain, the client radio frequency signal level is increased to a point comparable to the radio frequency signal level broadcasting from the radio transceiver 110 and a forward-reverse signal balance level is achieved. This can be viewed as send-receive balance or balanced input-output at the radio transceiver 110 output location.

The use of the bi-directional radio frequency amplifier 184 has two advantages: a) the balanced radio transceiver input-output increases the speed at which the radio portion of the communication can occur; and b) it increases the radio transceiver's 110 sensitivity to the client signal by adding up to 22 db gain to these generally very weak client signals as they enter the radio transceiver 110. Radio frequency signal level loss caused by the use of the bi-directional radio frequency amplifier 184 is 8 db. Therefore a forward gain of 8 db is generated in the bi-directional radio frequency amplifier 184 to compensate for this loss. The overall output power does not measurably change when compared to a non-amplified device, thereby allowing the amplified device to retain its output power-related FCC certification. This has been validated by an FCC testing lab. In all cases, the receive gain is increased by at least 22 db at the bi-directional amplifier, and is increased by at least 1,500 mw net gain total by combination of amplifier and antenna gain, also accounting for cable and amplifier insertion loss of up to 8 db.

Figure 5:
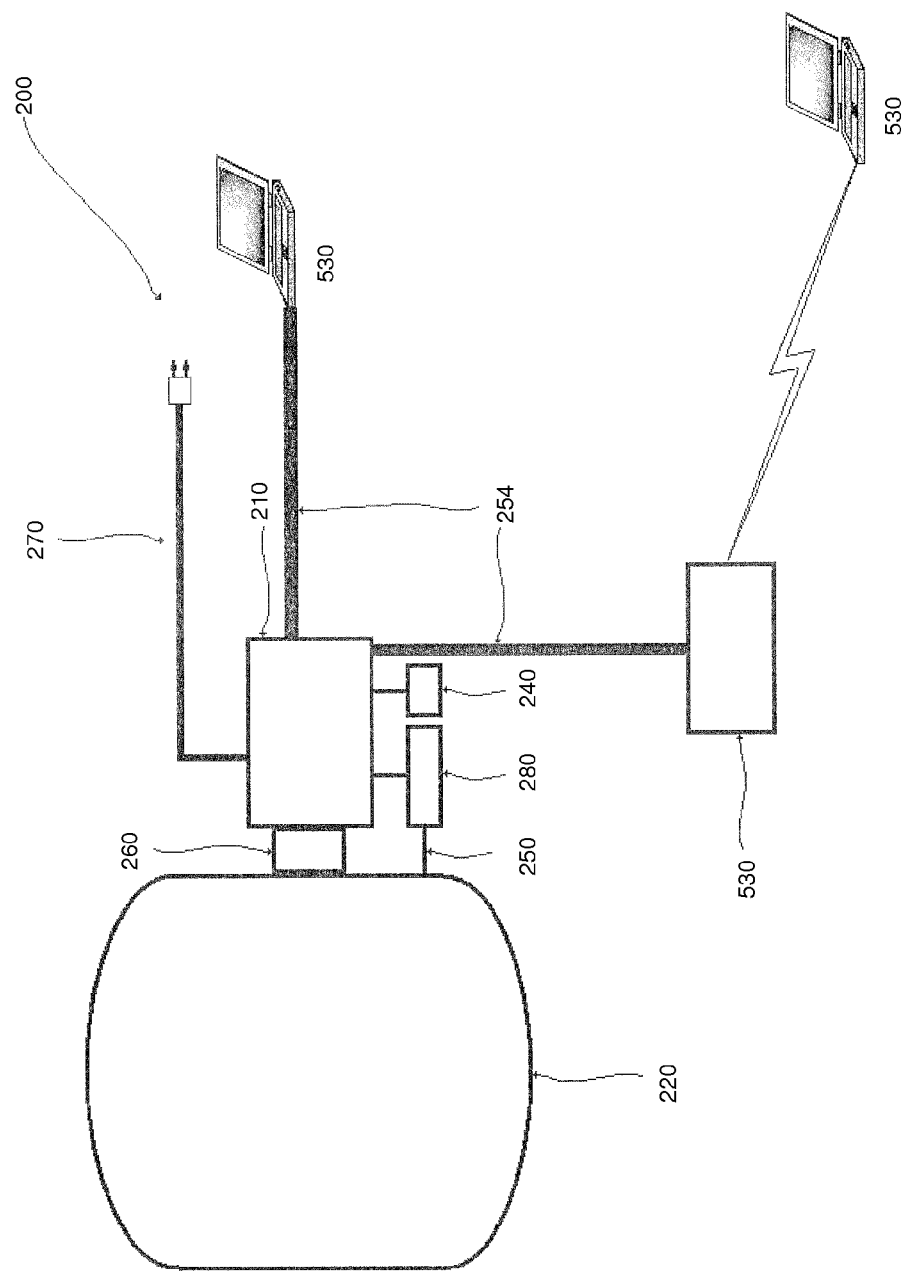
FIG. 5 is a schematic depiction of an embodiment of the wireless bridge device of the present invention.

The second of the wireless devices is a wireless bridge device 200 comprising a radio transceiver 210, an antenna element 220, a switch 240, cabling 250, an Ethernet cable 254, a heat sink 260, and a power supply interface 270. See FIG. 5. These elements allow the wireless bridge device 200 to receive electronic information from the wireless communication device 100 described above and to transmit the electronic information over the Ethernet cable 254 to one or more computing devices 530 located at the client site, as well as to receive electronic information from one or more computing devices 530 and to transmit the electronic information to the wireless communication device 100.

Alternatively, the Ethernet cable 254 may be connected to one or more wireless routers 230 located at the client site, allowing electronic information to be transmitted wirelessly to and from computing devices 530. An advantage of this functionality of the wireless bridge device 200 is that clients who are directly wired to the wireless bridge device 200 do not have to employ wireless adapters in their computing devices 530 in order to enjoy wireless Internet connectivity, since the wireless bridge device 200 provides the wireless connectivity functionality. This method of Internet connectivity will represent a cost savings to clients, especially those without wireless-ready computing devices 530. Another advantage of using a wireless bridge device 200 is that multiple wired clients can enjoy Internet connectivity from just one wireless bridge device 200 connection, realizing economy of scale for networks of more than two users. Yet another advantage of using the wireless bridge device 200 is that it can be used as the Internet gateway for an existing wireless network. This accommodates and allows long-distance wireless connectivity migration from every type of existing Ethernet network, without discarding previously purchased, previously configured, or previously deployed technology.

Figure 6:
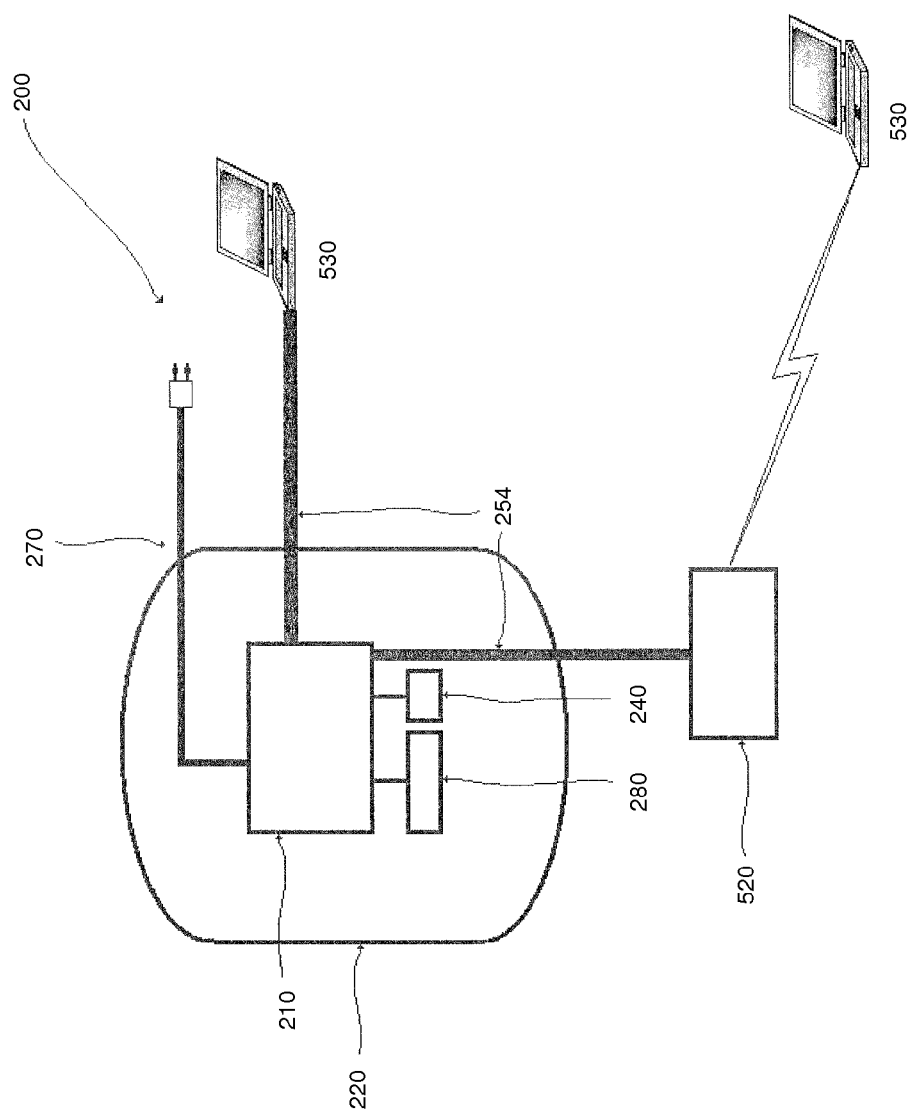
FIG. 6 is a schematic depiction of an alternative embodiment of the wireless bridge device.

The components of the wireless bridge device 200 are comprised of and/or configured in the same manner as their analogues described in the embodiments of the wireless communication device 100 described above. As with the wireless communication device 100, the radio transceiver 210 of the wireless bridge device 200 must be placed sufficiently close to the antenna element 220 to eliminate substantially all appreciable power loss between the radio transceiver 210 and the antenna element 220. In the preferred embodiment this is achieved by placing the radio transceiver 210 within an interior portion of a panel antenna used as the antenna element 220. See FIG. 6. In an alternative embodiment the antenna element 220 and the radio transceiver 210 are placed within a weather-resistant casing.

In another embodiment of the wireless bridge device 200, the wireless bridge device 200 further comprising an amplifier 280, suitably adapted to increase the strength of a radio frequency signal transmitted by the radio transceiver 210. Such an amplifier 280 is analogous to the amplifiers 180,182 described above in various embodiments of the wireless communication device 100.

Figure 7:
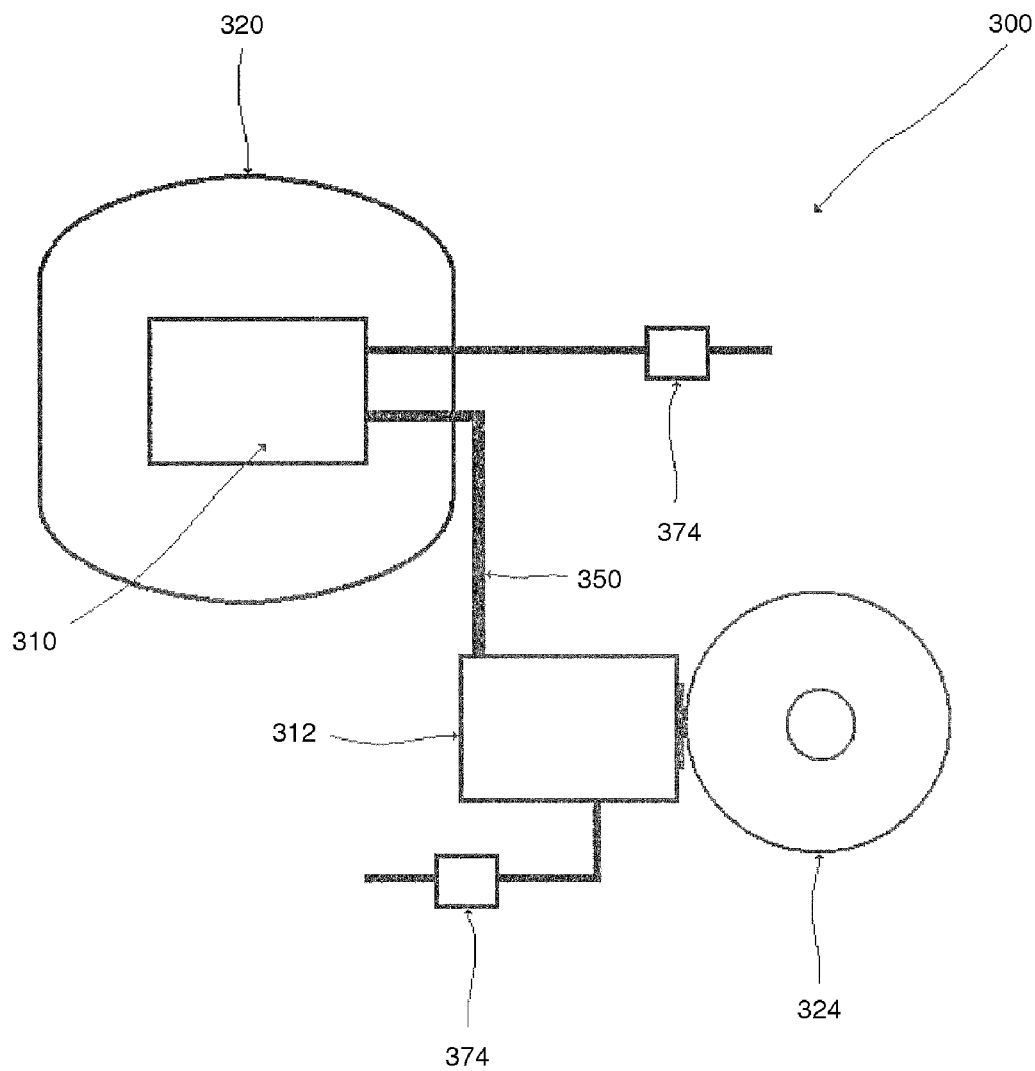
FIG. 7 is a schematic depiction of an embodiment of the wireless repeater of the present invention.

The third of the wireless devices is a wireless repeater 300. The wireless repeater 300 comprises a routing transmitter 310, a non-routing bridge receiver 312, a first antenna element 320, a second antenna element 324, cabling 350, and a power adapter 374. See FIG. 7. The routing transmitter 310 is suitably adapted to transmit radio frequency signals. The non-routing bridge receiver 312 is suitably adapted to receive radio frequency signals. The first antenna element 320 is suitably adapted to direct radio frequency signals from the routing transmitter 310. The second antenna element 324 is suitably adapted to direct radio frequency signals to the non-routing bridge receiver 312. The power adapter 374 is suitably adapted to provide power to the wireless repeater 300 from a power supply. Each of the routing transmitter 310, the non-routing bridge receiver 312, the power adapter 374, the first antenna element 320, and the second antenna element 324 are in physical communication with each other. All of these elements are individually well known in the art. The wireless repeater 300, configured thusly, provides wireless Internet connectivity directly to client site computing devices 530 at a range of up to 3.5 miles away. The wireless repeater 300 also provides wireless Internet connectivity indirectly to wired clients through the wireless bridge device 200. The wireless repeater 300 may be managed wirelessly by a management computer 535, as described above. Alternatively, it may have a physical connection over an Ethernet management cable to the management computer 535.

Figure 1:
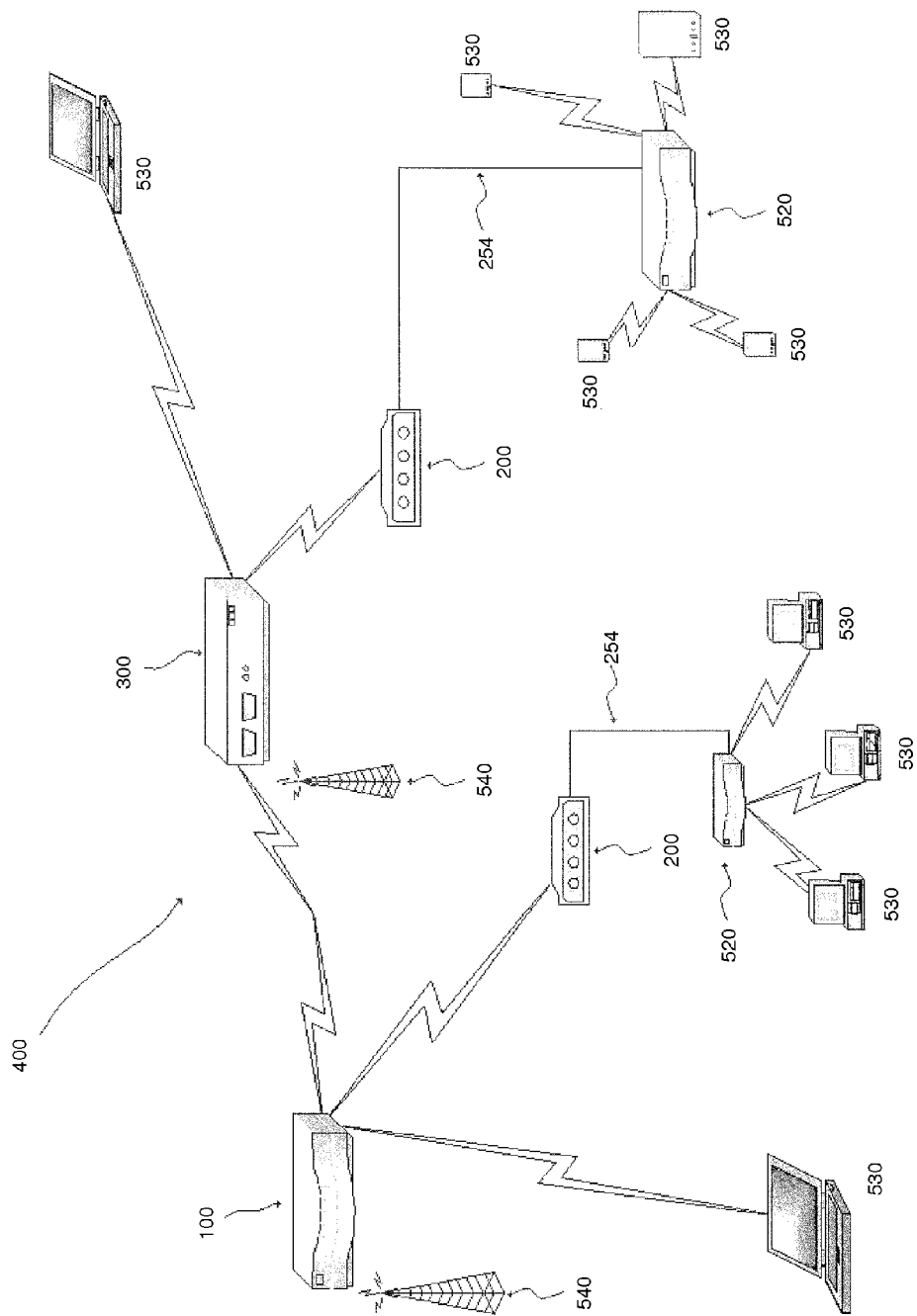
FIG. 1 is a schematic depiction of an embodiment of the wireless communication system of the present invention, showing a wireless communication device mounted on a tower, in direct wireless communication with a computing device and in indirect communication with additional computing devices through wireless communication with a wireless repeater mounted on a tower and wireless communication with a wireless bridge device; with the wireless repeater in direct wireless communication with a computing device and in indirect communication with additional computing devices through wireless communication with a wireless bridge device; and two wireless bridge devices each connected by Ethernet to wireless routers located at the client site, said wireless routers providing wireless connectivity to computing devices.

Typically, the wireless repeater 300 is mounted on a tower 540, see FIG. 1, though it may also be mounted on the exterior of a structure, such as on the roof of a building, on a utility pole, or in any other suitable location.

In the preferred embodiment the first antenna element 320 of the wireless repeater 300 is a medium range, weather-resistant panel antenna having an interior portion. The routing transmitter 310, the non-routing bridge receiver 312, and the power adapter 374 are placed into said interior portion of the first antenna element 320. The first antenna element 320 is then sealed against exterior environmental conditions.

In another embodiment the second antenna element 324 of the wireless repeater 300 is a short range dish antenna.

In yet another embodiment the second antenna element 324 of the wireless repeater 300 is a long range parabolic antenna.

The wireless communication system 400 is comprised of at least one wireless communication device 100. The wireless communication device 100 may be the simple device configured with a single radio transceiver 110 or the enhanced device configured with two radio transceivers 110,112. In the preferred embodiment the wireless communication system 400 also comprises at least one wireless bridge device 200. In yet another embodiment the wireless communication system 400 further comprises at least one wireless repeater 300. See FIG. 1. In this embodiment the wireless repeater 300 is used to increase the effective range of the wireless communication system 400. The wireless repeater 300 is geographically interposed between the wireless communication device 100 and the wireless bridge device 200, thereby allowing the wireless bridge device 200 to be located further from the wireless communication device 100 than the effective range of the wireless communication device 100. Where multiple wireless repeaters 300 are used the effective range of the wireless communication system 400 is further increased.

Configuring the wireless communication system 400 requires appropriate placement of the wireless devices. For example, the height of the wireless communication device 100 above the ground, as well as the height of the wireless repeater 300 above the ground, are factors dictating the ultimate range of the wireless communication system 400. These heights are calculated based on the distance from one device to the other while accounting for the freznel factor for 2.4 ghz frequencies as well as the known distance of the horizon at a given height relative to the curvature of the earth.

Other embodiments not specifically set forth herein are also within the scope of the following claims.

I claim:

1. A wireless communication system comprising:
   a wireless communication device, a communications management system, and at least one remote device,
   wherein said communications management system manages operations of the wireless communication device and said communications management system is operably connected to the wireless communication device,
   wherein said wireless communication device comprising:
      a first radio transceiver to receive and transmit radio frequency signals;
      an antenna element having capability to direct radio frequency signals to and from the first radio transceiver;
      a device communications management interface to provide communications between the wireless communication device and the communications management system;
      an asymmetric bi-directional radio frequency amplifier, said amplifier operationally interposed between the first radio transceiver and the antenna element, wherein the amplifier amplifies radio frequency signals received by the antenna element from the at least one remote device by a first gain and amplifies radio frequency signals transmitted from the first radio transceiver via the antenna element by a second gain, wherein the first gain is greater than the second gain, and wherein a maximum value of the second gain is a function of at least a maximum transmit power limit, and wherein the second gain of the amplifier is controlled by said communications management system to control the transmission power from the wireless communication device in a predetermined frequency band, said amplifier further comprising a filter to mitigate band-edge transmissions from propagating into upper and lower frequencies adjacent to the predetermined frequency band;
      a heat sink in thermal communication with the first radio transceiver and interposed between the first radio transceiver and the antenna element to dissipate heat from the wireless communication device; and
      a unitary weather protective housing, wherein the first radio transceiver, the device communications management interface, the amplifier, and the heat sink are contained within the unitary weather protective housing,
      wherein the first radio transceiver is positioned within 8 inches of the antenna element to eliminate substantially all appreciable power loss between the first radio transceiver and the antenna element;
   wherein the wireless communication device receives electronic information from said at least one remote device and transmits other electronic information to said at least one remote device, and
   wherein the wireless communication device transmits the electronic information from said at least one remote device to a communication system and receives the other electronic information from the communication system,
   wherein the communication system is connected to Internet, and said at least one remote device comprising:
      a second transceiver to receive and transmit radio frequency signals with the wireless communication device; and
      a second bi-directional amplifier, wherein said second bi-directional amplifier has a third gain for radio frequency signals transmitted from the second transceiver to the wireless communication device and a fourth gain for radio frequency signals received from the wireless communication device, wherein the third gain is less than the fourth gain.

2. The system of claim 1, wherein the first gain and the second gain are controlled independently.

3. The system of claim 1, wherein the first gain and the second gain are not independently controlled.

4. A wireless communication device comprising:
   a first radio transceiver to receive and transmit radio frequency signals;
   an antenna element having capability to direct radio frequency signals to and from the first radio transceiver;
   a device communications management interface to provide communications between the wireless communication device and a communications management system;
   an asymmetric bi-directional radio frequency amplifier, said amplifier operationally interposed between the first radio transceiver and the antenna element, wherein the amplifier amplifies radio frequency signals received by the antenna element from at least one remote device by a first gain and amplifies radio frequency signals transmitted from the first radio transceiver via the antenna element by a second gain, wherein the first gain is greater than the second gain, and wherein a maximum value of the second gain is a function of at least a maximum transmit power limit, and wherein the second gain of the amplifier is controlled by said communications management system to control the transmission power from the wireless communication device in a predetermined frequency band, said amplifier further comprising a filter to mitigate band- edge transmissions from propagating into upper and lower frequencies adjacent to the predetermined frequency band;
   a heat sink in thermal communication with the first radio transceiver and interposed between the first radio transceiver and the antenna element to dissipate heat from the wireless communication device; and
   a unitary weather protective housing, wherein the first radio transceiver, the device communications management interface, and the amplifier are contained within the unitary weather protective housing,
   wherein the first radio transceiver is positioned within 8 inches of the antenna element to eliminate substantially all appreciable power loss between the first radio transceiver and the antenna element, wherein the wireless communication device receives electronic information from said at least one remote device and transmits other electronic information to said at least one remote device, and wherein the wireless communication device transmits the electronic information from said at least one remote device to a communication system and receives the other electronic information from the communication system, wherein the communication system is connected to Internet, and said at least one remote device comprising:
 a second transceiver to receive and transmit radio frequency signals with the wireless communication device; and
 a second bi-directional amplifier, wherein said second bi-directional amplifier has a third gain for radio frequency signals transmitted from the second transceiver to the wireless communication device and a fourth gain for radio frequency signals received from the wireless communication device, wherein the third gain is less than the fourth gain.

5. A wireless communication system for relaying a radio frequency signal comprising:
 a first and second wireless communication devices; and
 a first and second communications management systems,
 wherein the first communications management system is operably connected to the first wireless communication device and the second communications management system is operably connected to the second wireless communication device, and the first and second communications management systems manages operations of the respective wireless communication device to which each device is connected,
 wherein the first wireless communication device comprising:
  a first radio transceiver to receive and transmit radio frequency signals;
  a first antenna element having capability to direct radio frequency signals to and from the first radio transceiver;
  a first device communications management interface to provide communications between the first wireless communication device and the first communications management system;
  a first asymmetric bi-directional radio frequency amplifier, said first amplifier operationally interposed between the first radio transceiver and the first antenna element, wherein the first amplifier amplifies radio frequency signals received by the first antenna element from the second wireless communication device by a first gain and amplifies radio frequency signals transmitted from the first radio transceiver via the first antenna element by a second gain, wherein the first gain is greater than the second gain, and wherein a maximum value of the second gain is a function of at least a maximum transmit power limit, and wherein the second gain of the first amplifier is controlled by said first communications management system to control the transmission power from the first wireless communication device in a predetermined frequency band, said first amplifier further comprising a filter to mitigate band-edge transmissions from propagating into upper and lower frequencies adjacent to the predetermined frequency band;
  a heat sink in thermal communication with the first radio transceiver and interposed between the first radio transceiver and the first antenna element to dissipate heat from the first wireless communication device; and
  a unitary weather protective housing, wherein the first radio transceiver, the first device communications management interface, the first amplifier, and the heat sink are contained within the first unitary weather protective housing, wherein the second wireless communication device comprising:
   a second radio transceiver to receive and transmit radio frequency signals;
   a second antenna element having capability to direct radio frequency signals to and from the second radio transceiver;
   a second device communications management interface to provide communications between the second wireless communication device and the second communications management system; and
   a second asymmetric bi-directional radio frequency amplifier, said second amplifier operationally interposed between the second radio transceiver and the second antenna element, wherein the second amplifier amplifies radio frequency signals received by the second antenna element from the first wireless communication device by a third gain and amplifies radio frequency signals transmitted from the second radio transceiver via the second antenna element by a fourth gain, wherein the third gain is greater than the fourth gain, and wherein a maximum value of the fourth gain is a function of at least a second maximum transmit power limit, and wherein the fourth gain of the second amplifier is controlled by said second communications management system to control the transmission power from the second wireless communication device in a second predetermined frequency band, said second amplifier further comprising a filter to mitigate band-edge transmissions from propagating into upper and lower frequencies adjacent to the second predetermined frequency band,
  wherein the first wireless communication device receives electronic information from said second wireless communication device and transmits other electronic information to said second wireless communication device, and said second wireless communication device receives other electronic information from said first wireless communication device and transmits electronic information to said first wireless communication devices and wherein the first and second wireless communication devices communicate with at least the Internet or another wireless communication device; wherein communication is established through the first and second communication devices between the Internet and another wireless communication device;
 wherein each of the first and second radio transceivers are positioned within 8 inches of the first and second antenna elements respectively to eliminate substantially all appreciable power loss between the each of the first and second radio transceivers and the first and second antenna elements.

6. The system of claim 5, wherein the first gain and the second gain are controlled independently.

7. The system of claim 6, wherein the third gain and the fourth gain are controlled independently.

8. The system of claim 5, wherein the second gain and the fourth gain are controlled independently.

* * * * *